United States Patent
Bizzi et al.

(10) Patent No.: US 9,418,418 B2
(45) Date of Patent: Aug. 16, 2016

(54) METHOD FOR QUANTIFYING THE MORPHOLOGICAL REGULARITY DEGREE OF THE PELLUCID ZONE IN EMBRYOS AND OOCYTES

(71) Applicant: ADVANCED COMPUTER SYSTEMS A.C.S. S.P.A., Rome (IT)

(72) Inventors: Stefano Bizzi, Rome (IT); Luca Galli, Rome (IT)

(73) Assignee: ADVANCED COMPUTER SYSTEMS A.C.S. S.P.A., Rome (IT)

(*) Notice: Subject to any disclaimer, the term of this patent is extended or adjusted under 35 U.S.C. 154(b) by 17 days.

(21) Appl. No.: 14/376,740

(22) PCT Filed: May 17, 2013

(86) PCT No.: PCT/IB2013/054053
§ 371 (c)(1),
(2) Date: Aug. 5, 2014

(87) PCT Pub. No.: WO2013/182929
PCT Pub. Date: Dec. 12, 2013

(65) Prior Publication Data
US 2015/0036912 A1   Feb. 5, 2015

(30) Foreign Application Priority Data
Jun. 5, 2012   (IT) .............................. RM2012A0257

(51) Int. Cl.
*G06K 9/00*   (2006.01)
*G06T 7/00*   (2006.01)
*G06T 7/60*   (2006.01)
*G06K 9/52*   (2006.01)

(52) U.S. Cl.
CPC ............ *G06T 7/0012* (2013.01); *G06K 9/0014* (2013.01); *G06K 9/525* (2013.01); *G06T 7/0083* (2013.01); *G06T 7/0085* (2013.01); *G06T 7/0091* (2013.01); *G06T 7/602* (2013.01); *G06T 2207/20036* (2013.01); *G06T 2207/30024* (2013.01); *G06T 2207/30044* (2013.01)

(58) Field of Classification Search
USPC ........................................................ 382/133
See application file for complete search history.

(56) References Cited

U.S. PATENT DOCUMENTS

| 7,194,124 | B2 * | 3/2007 | Soll ....................... G06T 7/0012 382/133 |
| 8,428,331 | B2 * | 4/2013 | DiMarzio .......... G02B 21/0004 382/133 |
| 8,989,475 | B2 * | 3/2015 | Wong ................... C12N 5/0604 382/128 |

(Continued)

FOREIGN PATENT DOCUMENTS

| EP | 1 918 692 | 5/2008 |
| WO | 2007/115297 | 10/2007 |

OTHER PUBLICATIONS

International Search Report for PCT/IB2013/054053, four pages (Nov. 2013).

(Continued)

*Primary Examiner* — John Strege
(74) *Attorney, Agent, or Firm* — Nixon & Vanderhye PC

(57) ABSTRACT

The present invention refers to a method for calculating a shape factor indicative of the evenness of the pellucid zone thickness of a biological structure and to a method for evaluating the evenness of the pellucid zone thickness of a biological structure through said shape factor.

19 Claims, 4 Drawing Sheets

(56) References Cited

U.S. PATENT DOCUMENTS

| | | | | |
|---|---|---|---|---|
| 2007/0231785 | A1* | 10/2007 | Hoyt | G01N 21/23 435/4 |
| 2007/0269096 | A1* | 11/2007 | Timmis | A01C 1/00 382/133 |
| 2008/0170227 | A1* | 7/2008 | Schimming | G01J 4/04 356/364 |
| 2008/0247628 | A1* | 10/2008 | Ramsing | G06K 9/00127 382/133 |
| 2009/0141960 | A1* | 6/2009 | Yamamoto | G01N 21/6458 382/133 |
| 2011/0092762 | A1* | 4/2011 | Wong | C12N 5/0604 600/34 |

OTHER PUBLICATIONS

Written Opinion of the ISA for PCT/IB2013/054053, seven pages (Nov. 2013).

Santos Filho et al. "Toward a method for automatic grading of microscope human embryo images" Biomedical Imaging: From Nano to Macro, ISBI 2010, pp. 1289-1292 (Apr. 2010).

Pacala et al. "Establishing some morphometric parameters usable in estimating the quality of mouse embryos, in different developmental stages" Lucrari Stiintifice—Seria Zootehnie, vol. 55, pp. 311-314 (Jan. 2010).

* cited by examiner

METHOD FOR QUANTIFYING THE MORPHOLOGICAL REGULARITY DEGREE OF THE PELLUCID ZONE IN EMBRYOS AND OOCYTES

This application is the U.S. national phase of International Application No. PCT/IB2013/054053, filed 17 May 2013, which designated the U.S. and claims priority to Italian Application No. RM2012A000257, filed 5 Jun. 2012; the entire contents of each of which are hereby incorporated by reference.

DESCRIPTION

The present invention refers to a method for calculating a shape factor indicative of the evenness of the pellucid zone thickness of a biological structure, and to a method for evaluating the evenness of the thickness of the pellucid zone of said structure through said shape factor.

The pellucid zone is a glycoprotein membrane surrounding the egg-cell (oocyte) of mammals, and produced by the oocyte during oogenesis. The pellucid zone is, in particular, a primary envelope positioned between the plasma membrane of the egg-cell and the follicular cells, having various functions, among which those of: fostering sperm binding by the presence of specific receptors, contributing to polyspermy blocking, protecting the embryo during segmentation, inducing the freeing of lytic enzymes present in the acrosome and ensuring species-specificity of the fertilization.

The analysis of the morphological features of oocytes and embryos is frequently performed by specialist physicians and technicians for various purposes. In particular, in Assisted Reproductive Technology (ART) techniques, evaluations about the morphological features of the oocyte can allow to obtain information about, e.g., the potential fertility of the egg-cell, the potential attachment or the course of the pregnancy post-implantation. To this end, the specialist normally acquires images of the oocytes or embryos in the phases preceding implantation with ART and performs evaluations about their morphological features on the basis of his/her experience and observation ability.

The main and most common methodologies of embryos and oocytes analysis and morphological classification used are based on the evaluation of a plurality of heterogeneous morphological features, among which, e.g., cell shape symmetry, cell number, internal structure homogeneity, presence of corpuscles, aspect of the polar globule, and of the perivitelline space. Such evaluations, being based on experience and observation ability, hence ultimately on criteria not always quantitative and objective, are linked to a certain degree of subjectivity and therefore entail various drawbacks. In particular, experimental evidence related to the applying of such methodologies indicates, for instance, how the grade of parameters detected cannot yet be wholly correlated with the actual success of ART procedures.

In the scientific literature, also methods alternative to the above-indicated ones have been proposed, such as the characterizing of the variability, or in a dual sense the evenness, of the pellucid zone and, in particular, of its thickness.

Such methods are based on the calculation of the percent variation of pellucid zone thickness (PZTV) from "manual" measurements performed by the specialist technician at a small number of dots, from about 4 to 8, on the image of the embryo or oocyte. Several are the drawbacks associated with such methods; in particular, the measurements of variability of the pellucid zone depend on operator-selected points on the image, and even in case the thickness is measured in a fixed set of dots (the same for any operator), the same measurements depend on the orientation of the embryo itself, therefore a change in embryo orientation entails a different measurement of the pellucid zone variability.

Moreover, the small number of sampling dots (from 4 to 8) on the images and the absence of suitable procedures of filtering, optimization, automated edge detection of the pellucid zone image, allow a measurement strictly limited to low-frequency variability, providing a very approximate and incomplete information as regards irregularity levels particularly concentrated in sections of the pellucid zone.

Accordingly, to date neither conclusive evidence, nor an effective applying of the morphological features of the pellucid zone in the medical field have been attained, in particular in support of assisted reproductive technology (ART) procedures.

Aim of the present invention is to propose a novel and original solution to the drawbacks present in the state of the above-mentioned known art and related to methods for measuring the evenness of the pellucid zone.

A first object of the present description is a method for calculating a shape factor indicative of the evenness of the pellucid zone thickness of a biological structure.

A second object of the present description is a method for evaluating the evenness of the thickness of the pellucid zone of a biological structure through a shape factor calculated by the above method.

Preferred features of the objects of the present description are reported in the related dependent claims.

In particular, the present description refers to a method for calculating a shape factor indicative of the evenness of the pellucid zone thickness of a biological structure, such as, e.g., oocyte, embryo or zygote, method characterized in that any variation in thickness of the pellucid zone contributes to the defining of the value of the shape factor, and therefore to the evaluation of the evenness of the thickness. This, unlike what occurs with the methods known in the state of the art, in which analyzed thickness is exclusively a function of the maximum and minimum value of such thickness of the pellucid zone. In particular, such a result is attained thanks to the fact that the shape factor, in the method described herein, is a function of the length of a broken line and of a set of local bendings, calculated at each vertex related to said broken line, wherein the broken line is a representation on a Cartesian plane of such pellucid zone thickness, as better detailed hereinafter.

The method described herein entails a series of advantages, among which a greater accuracy in the calculation of the pellucid zone thickness with respect to the known and currently used morphological analysis methodologies. In particular, the method proposed herein enables to overcome the main limitations encountered with common methodologies, since it allows to calculate a value of the pellucid zone thickness not based anymore on subjective criteria, such as experience and observation ability, but rather on geometric parameters from an acquired image related to the pellucid zone. Moreover, precisely because the method is based on objective parameters of analysis, variations in the calculation of the pellucid zone thickness that are observed with the use of the known methods and due, e.g., to changes in biological structure orientation, are eliminated with the method described herein. One of the advantages of the present invention is therefore the obtainment of a detailed and precise value unaffected by variability linked to the performing by the individual operator and/or the particular orientation of the biological structure of interest. Accordingly, the method described herein ultimately allows the obtainment of a value of the shape factor related to the evenness of the pellucid zone thickness, value which is robust and ensures a high reliability of use, like, e.g., for medical purposes such as assisted reproductive technology.

Moreover, said method can be advantageously performed, in each of its steps, automatically by use of a computer.

Further advantages, as well as the features and the modes of employ of the present invention, will be made apparent in the following detailed description related to possible embodiments thereof, given by way of a non-limiting example. Reference will be made to the figures of the annexed drawings, wherein.

Object of the present description is a method for calculating a shape factor ψ indicative of the evenness of the pellucid zone PZ thickness of a biological structure.

"Pellucid zone PZ" in the present description signifies the glycoprotein membrane positioned externally to the plasma membrane of biological structures, such as fertilized (zygote) or non-fertilized egg-cell (oocyte) and embryo. Preferably, said biological structure belongs to animals such as mammals, even more preferably to human beings. The wording "pellucid zone thickness" therefore denotes the thickness of the membrane surrounding the plasma membrane, for instance, of the oocyte.

Figure 1:
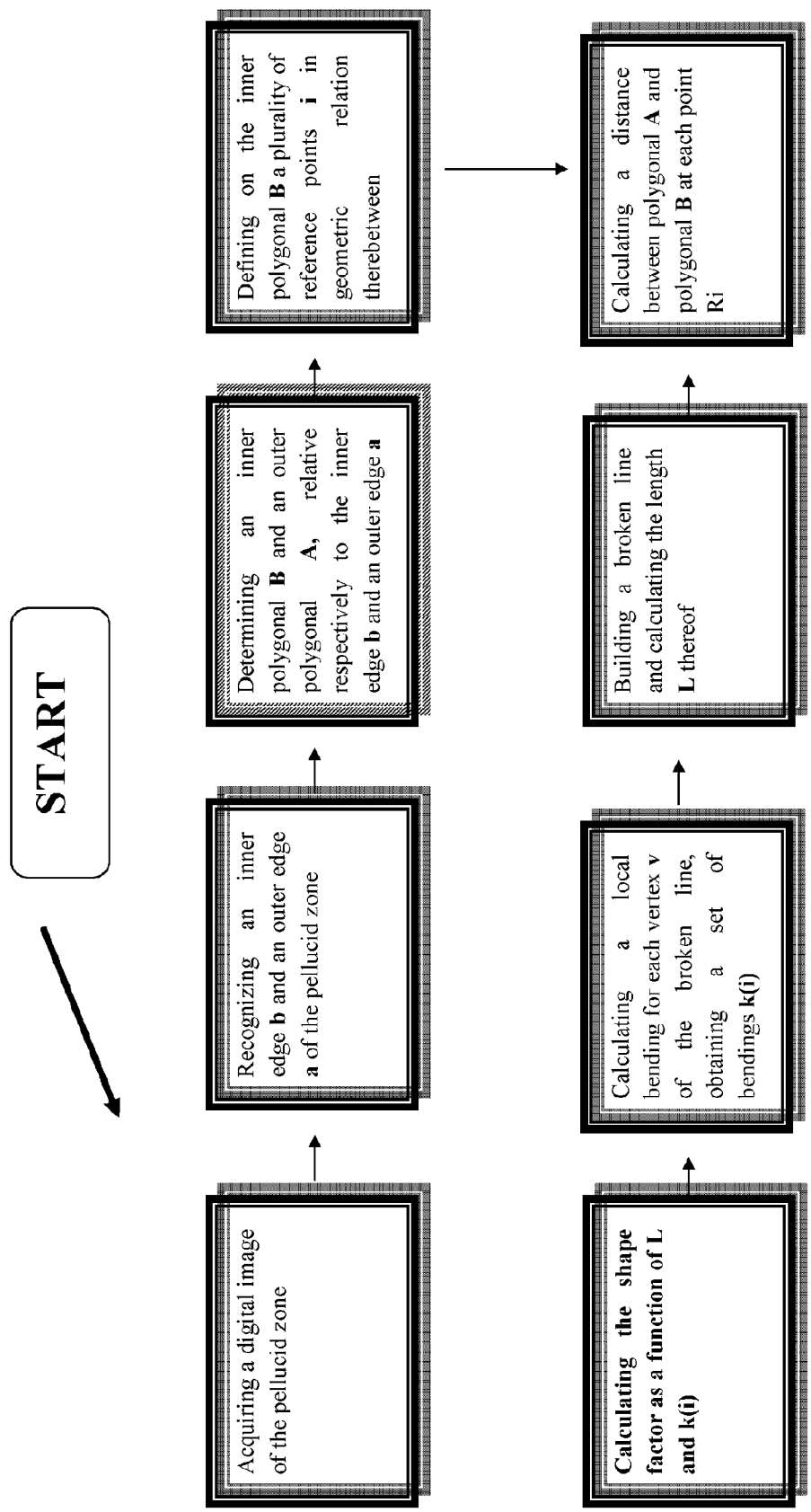
FIG. 1 shows a schematic depiction of the operation steps of an embodiment of the method described herein.
Figure 2A:
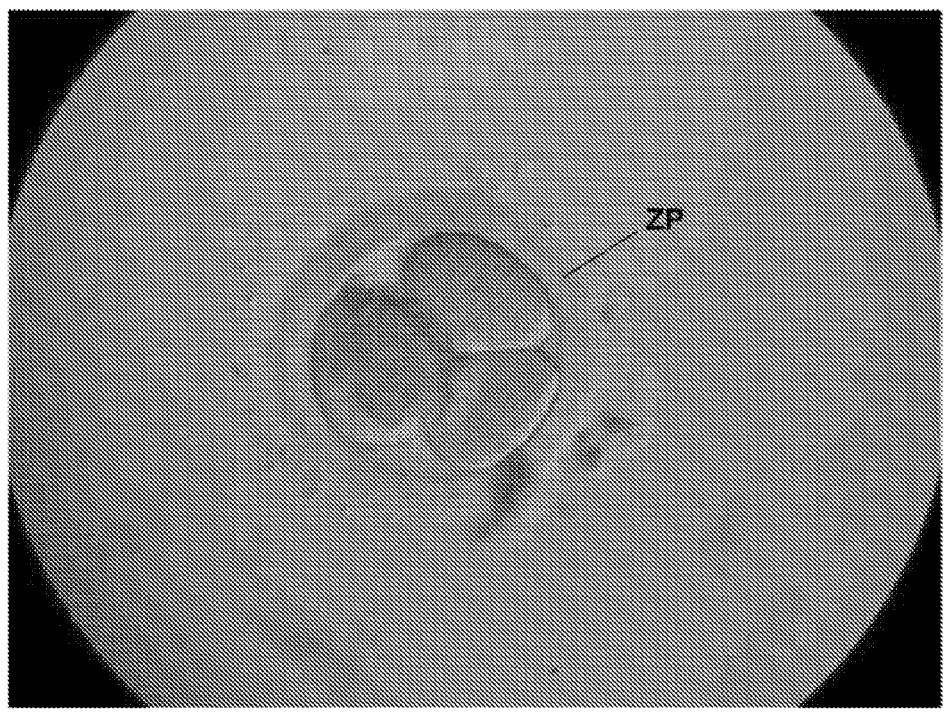
FIGS. 2A, 2B, 2C and 2D show a blastocyst with the related pellucid zone PZ.

The method comprises a series of operative steps of mathematical/geometrical nature to be performed from an acquired digital image of the pellucid zone PZ to be analyzed. Such image to be acquired may comprise the biological structure with the respective pellucid zone PZ, like, e.g., an embryo (blastocyst) in which the pellucid zone PZ is visible, as shown in FIG. 2A. Alternatively, the image may consist in the sole pellucid zone PZ. Pellucid zone PZ image acquiring can be performed by means of instruments suitable to this end. The technician in the field is capable of acquiring an image of interest on the basis of his/her knowledge, so that no further details need to be provided herein. Merely by way of example, the image acquiring related to the pellucid zone PZ can be performed with a laboratory microscope. To the ends of the present invention, the image to be acquired has a resolution and definition such as to allow detail detection of the pellucid zone PZ itself. Preferably, the image has a resolution of at least 1000×1000 dots.

In embodiments of the present method, also additional steps of processing the acquired image may be provided, like, e.g. a step of filtering the image itself. Merely by way of example, a step of filtering may be aimed at detecting and eliminating the acquired image, e.g. of cells, corpuscles proximal to the pellucid zone PZ, typically of dimensions much smaller than the oocyte or embryo of interest. Such step may be carried out by "region growing" filtering, i.e. techniques allowing to examine the neighbourhood of a structure of interest including or excluding therefrom the various point-shaped elements analyzed on the basis of a homogeneity standard related to their intensity.

Moreover, the acquired image can also be subjected to geometric calibrations and normalizations in order to improve its quality. In this perspective, one or more steps of normalization of the acquired image can be provided. By way of a non-limiting example, the normalization can be a geometric normalization, performed relative to a reference image and whose aim is to eliminate, e.g., any optical deformations introduced on the image by the acquiring system. According to what described herein, the reference image is preferably a known geometric pattern associated to the type of device used for the acquiring.

The normalization step may also be of radiometric type, i.e. aimed at eliminating chromatic, contrast or luminosity imbalances, as well as noise components present in the acquired image. Such radiometric normalization may be performed by automatic rebalancing of the components, e.g. colour, luminosity, contrast to values standard for the typology of image of interest, and also by spectral filtering algorithms for noise abatement, to be optionally applied in an "adaptive" mode, or heterogeneously and specifically on different areas of the image.

Figure 2B:
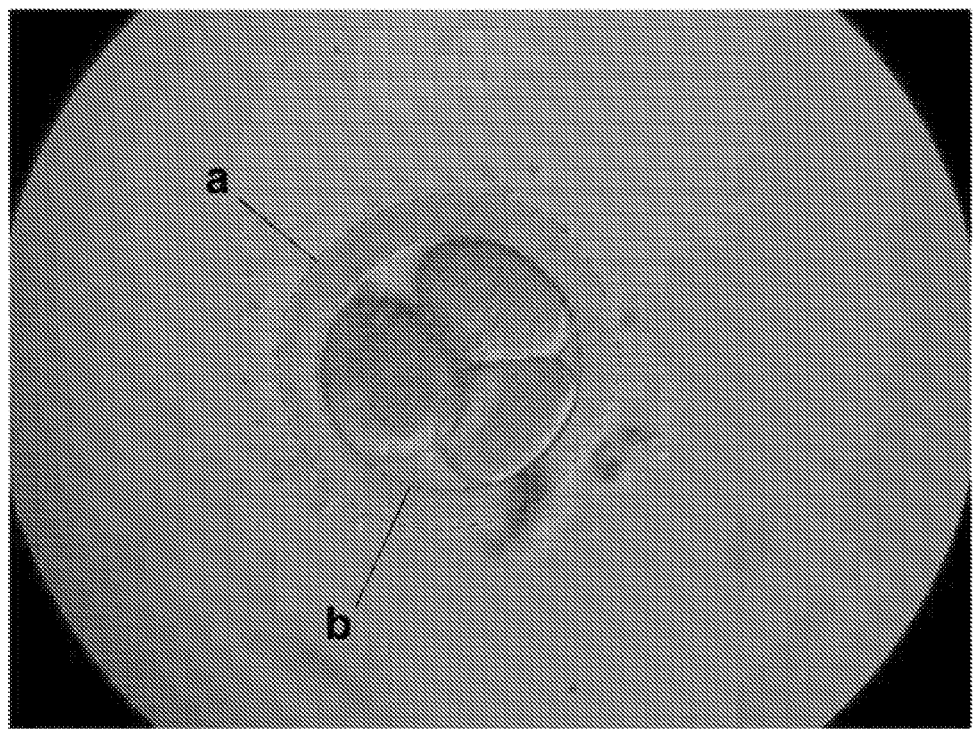

From said acquired image it is possible to recognise an outer edge and an inner edge of the pellucid zone PZ. In particular, as shown in FIG. 2B, the outer edge a corresponds to a distal edge of the pellucid zone PZ with respect to the biological structure, such as, e.g., a blastocyst, whereas the inner edge b corresponds to a proximal edge of the pellucid zone PZ with respect to the same blastocyst. Moreover, the outer a and inner b edge singled out can be better identified by specific steps additional to the method at issue.

Figure 2C:
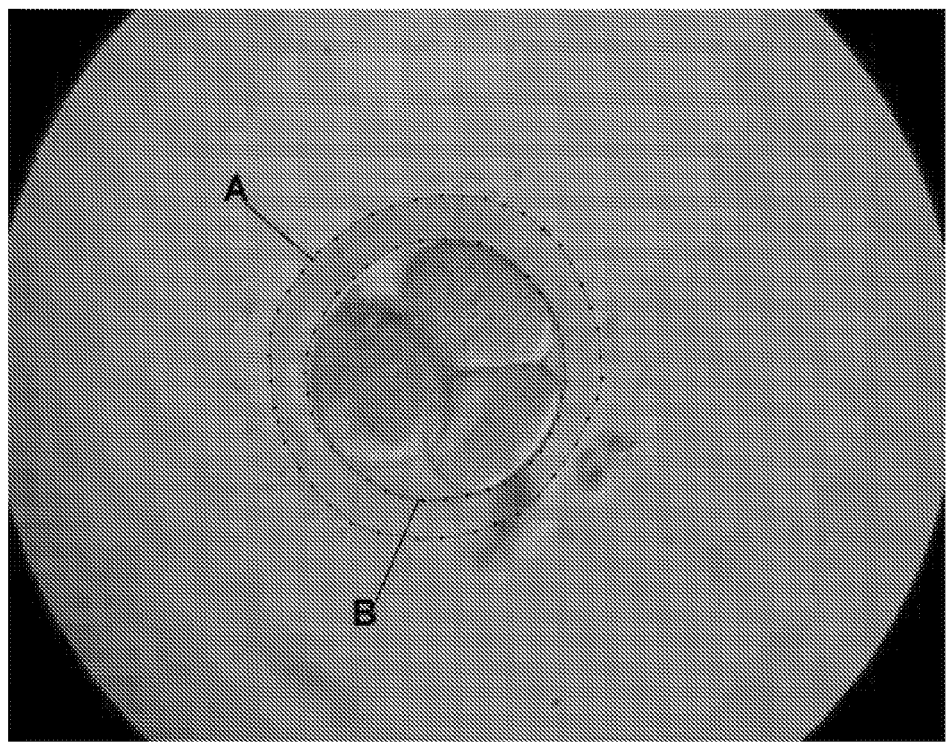

Upon singling out said inner b and outer a edge, the next step consists in extracting from the outer a and inner b edge first points and second points, respectively. In general, the step of extracting said points consists in labelling the points (dots) of a digital image, in this case limited to the above-indicated edges, in which a change in luminous intensity is observed, in order to describe image morphology. Such extracting can be performed with the use of methods developed therefor, preferably with edge detection methods. As shown in FIG. 2C, the interpolation of the first points extracted from the outer edge an enables to determine and single out an outer polygonal A and, likewise, as shown in FIG. 2C, the interpolation of the second points extracted on the inner edge b determines an inner polygonal B.

Figure 2D:
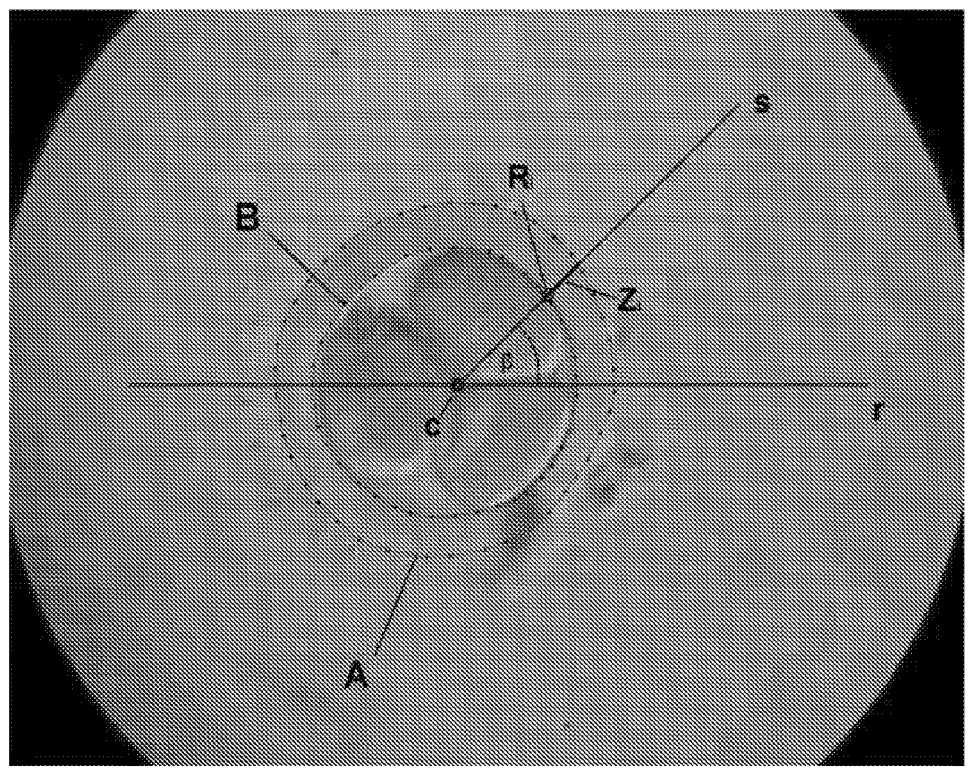

Upon determining the polygonals A and B, on one or both of them a plurality of reference points $R_i$ will be singled out and defined. In particular, as exemplified in FIG. 2D, the reference points i are defined on the basis of a geometric relation existing therebetween. By way of a non-limiting illustration, said geometric relation may be function of an angle $\beta_i$ formed between a half-line s, passing for each reference point $R_i$, and a barycentre c of the inner polygonal B, and a reference line r passing for said barycentre c. The barycentre c is calculated beforehand and, as just mentioned, is related to the inner polygonal B. The reference line r may be any line passing for the barycentre c whose definition allows to identify the values of angle $\beta_i$ through which the various reference points i are in geometric relation.

The number N of reference points Ri (with i varying from 1 to N) can vary remarkably, and it will be apparent that the greater their number, the more precise the calculation of the shape factor, and therefore the indication about the evenness of the pellucid zone thickness, will be.

By way of a non-limiting illustration, it is calculated, at each reference point Ri, a corresponding distance between the two polygonals A and B, so obtaining for N reference points Ri a set of N distances. In particular, referring to FIG. 2D, the distance between the polygonals A and B is calculated as a length of a segment z on the half-line s, originating in the barycentre c of the inner polygonal B and passing for the reference point Ri, comprised between the inner polygonal B and the outer polygonal A.

Figure 2E:
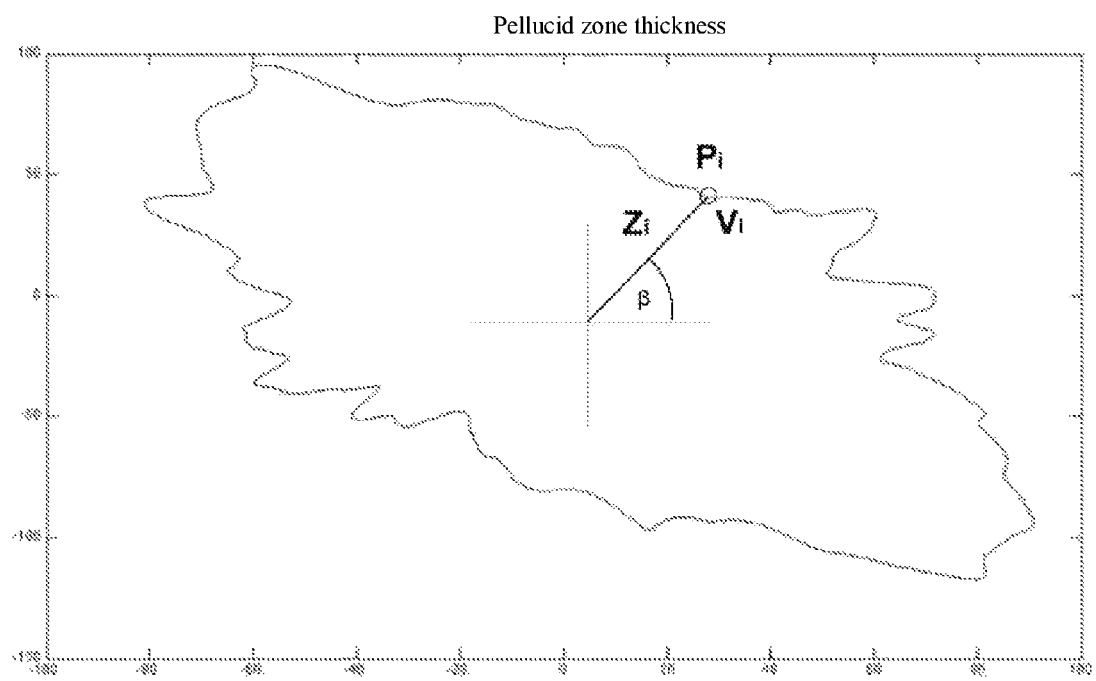
FIG. 2E shows an example of broken line representing the set of distances related to thickness samplings of the pellucid zone PZ.

The set of distances, i.e. the lengths of the segments $z_i$, are subsequently utilized for building, in a Cartesian plane, a broken line representing said set of distances as a function of the geometric relation. According to a preferred embodiment illustrated in FIG. 2E, the representation of the set of distances occurs in a Cartesian plane in polar coordinates, as a function of an angular parameter $\beta_i$ defined for each point Ri as the angle comprised between the half-line s, passing for the barycentre c and the point Ri, and a reference line r passing for said barycentre c. In the preferred embodiment, in which the geometric relation is a function of angle $\beta_i$, the broken line is therefore singled out in a Cartesian plane by points $p_i$ whose distance from the origin of axes corresponds, for each of them, to the individual distances $z_i$ and the angles to the related values of angle $\beta_i$, defined as above-described. Then, from a graphic connection of subsequent points $p_i$ a broken line is built, of which, moreover, the length L is calculated. Due to what was mentioned above, the broken line is therefore a sequence of N segments, each comprised between two successive points $p_i$ in the Cartesian plane, and that will have a number N of vertexes v corresponding to the number of the same points $p_i$ as shown in FIG. 2E.

At each of such vertexes $v_i$ a local bending is calculated, apt to approximate la broken line within a neighbourhood of each vertex $v_i$ or point $p_i$. The end result of said operation is a set of local bendings k(i), set therefore formed by N local bendings calculated, due to what was mentioned above, at N vertexes $v_i$.

In a preferred embodiment of the present method, the local bending is calculated according to the following formula:

$$k(i) = \frac{\dot{x}(i)\ddot{y}(i) - \ddot{x}(i)\dot{y}(i)}{[\dot{x}(i)^2 + \dot{y}(i)^2]^{3/2}}$$

wherein
(i), varying from 0 to N, indicates said vertexes $v_i$ of the broken line corresponding to the reference points ($R_i$),
(x(i),y(i)) represents the Cartesian coordinates of each of said vertexes $v_i$,
($\dot{x}(i),\dot{y}(i)$) represents the first derivative of the curve at each of said vertexes $v_i$, and
($\ddot{x}(i),\ddot{y}(i)$) represents the second derivative of the curve at each of said vertexes $v_i$.

As to the calculation of the shape factor ψ according to the method described herein, allowing to obtain an indication related to the evenness of the pellucid zone thickness, it is finally calculated as a function of the length L of the broken line, as well as of the set of local bendings k(i).

In a preferred embodiment of the present method, the shape factor ψ is calculated through the formula:

$$\Psi(\alpha) = (L^\alpha / N) \sum_{i=0}^{N-1} k(i)^\alpha$$

This formula identifies a family of functions where α is a factor identifying a particular function of the family, L is the length of said broken line as defined above, and N is the number of said reference points $R_i$ of the broken line. In a particularly preferred embodiment of the invention, α is α=2 and N is greater than 800.

The information of the evenness of the pellucid zone thickness represents a morphological parameter that, as already indicated above, is used in the clinical practice, for instance, in Assisted Reproductive Technology (ART) techniques for evaluating the features of the oocyte, of the zygote, of the embryo, aimed at indicating a probability of positive result of the ART procedure. It follows that the shape factor ψ calculated according to the method described herein can be used by specialists, such as, e.g., physicians and biologists, as evaluation parameter in the clinical field.

Therefore, object of the present description is also a method for evaluating the evenness of the pellucid zone thickness of a cell through a shape factor iv calculated with the above method. In an embodiment of the hereto-defined method, said evaluating can also be carried out by using a computer. Preferably, to the ends of the method for evaluating, the shape factor ψ is calculated through the afore-defined formula $$\Psi(\alpha) = (L^\alpha / N) \sum_{i=0}^{N-1} k(i)^\alpha.$$

To verify the reliability of the calculation of the shape factor ψ to the ends of the method for evaluating, various experimental analyses were performed in which, for a group of digital images of embryos for which the ART procedure result was known (i.e., non-pregnancy, abortion, birth), the shape factor ψ as described in the present description was calculated. Experimentation outcomes enabled to single out the values of shape factor iv with respect to which it is possible to indicate or not to indicate the evenness of the pellucid zone thickness.

In particular, by way of a non-limiting example, by applying the above formula for α=2, a value of the shape factor ψ lower than $18-19 \times 10^3$ is indicative of a substantial evenness of the pellucid zone thickness. Vice versa, for values of the shape factor ψ with α=2 markedly higher than $18-19 \times 10^3$ a significant low evenness of the pellucid zone thickness is detected.

Further outcomes of the experimentation indicated a substantial correlation between unevenness of the pellucid zone thickness, calculated as described above, and probability of a positive result of the ART procedure (birth).

In particular, embryos with a value of the shape factor ψ for α=2 greater than $18-19 \times 10^3$ (low evenness of the pellucid zone thickness), entail sensibly greater probabilities of a positive result of the ART procedure (birth) with respect to embryos with a value of the shape factor ψ for α=2 lower than said threshold $18-19 \times 10^3$, (substantial evenness of the pellucid zone thickness). The experimentation findings further highlight how the evaluating of the shape factor iv, jointly to the classification of other morphological aspects of the embryo according to evaluation procedures adopted by physicians and biologists, can provide a more precise correlation with the probabilities of a positive result of the ART procedure (birth).

Object of the present description is also a computer program which is apt to implement a method for calculating a shape factor indicative of the evenness of the pellucid zone of a biological structure as afore-defined, when running in a computer.

The same program can evidently implement also a method for evaluating the evenness of the pellucid zone thickness of a biological structure as afore-described.

The present invention has hereto been described with reference to preferred embodiments thereof. It is understood that other embodiments might exist, all falling within the concept of the same invention, and all comprised within the protective scope of the claims hereinafter.

The invention claimed is:

1. A method for calculating a shape factor indicative of evenness of pellucid zone thickness of a biological structure, wherein the method comprises:
   acquiring a digital image comprising said pellucid zone;
   recognizing an outer edge (a) and an inner edge (b) of said pellucid zone, said outer edge and said inner edge respectively being a distal edge and a proximal edge of said pellucid zone with respect to said structure;
   extracting first points of said outer edge;
   interpolating said first points determining an outer polygonal A;
   extracting second points of said inner edge;
   interpolating said second points determining an inner polygonal B;
   defining a plurality of reference points ($R_i$) geometrically related therebetween on the inner polygonal and/or on the outer polygonal;
   calculating, at each of said reference points ($R_i$), a corresponding distance between said polygonals, to obtain a set of distances ($7_i$);
   building a broken line representing said set of distances as a function of said geometric relation;
   calculating a length (L) of said broken line;
   calculating, at each vertex ($v_i$) of said broken line, a local bending apt to approximate said broken line, within a neighbourhood of the vertex ($v_i$), to obtain a set of bendings (k(i)); and
   calculating said shape factor ($\psi$) of the pellucid zone as a function of the length (L) of said broken line and of said set of bendings (k(i)).

2. The method according to claim 1, wherein said shape factor is calculated through the formula:

$$\Psi(\alpha) = (L^\alpha / N) \sum_{i=0}^{N-1} k(i)^\alpha$$

which identifies a family of functions wherein
   L is the length of said broken line,
   N is the number of the reference points ($R_i$) or the vertexes ($v_i$) of said broken line, and
   $\alpha$ is a factor identifying a particular function of the family.

3. The method according to claim 2, wherein $\alpha$ is 2 and N is greater than 800.

4. The method according to claim 1, wherein said local bending is calculated through the formula:

$$k(i) = \frac{\dot{x}(i)\ddot{y}(i) - \ddot{x}(i)\dot{y}(i)}{[\dot{x}(i)^2 + \dot{y}(i)^2]^{3/2}}$$

wherein (i) varying from 0 to N, indicates the vertexes of said broken line corresponding to the reference points ($R_i$),
   (x(i),y(i)) represents the Cartesian coordinates of each of said vertexes,
   ($\dot{x}(i),\dot{y}(i)$) represents the first derivative of the curve at each of said vertexes, and
   ($\ddot{x}(i),\ddot{y}(i)$) represents the second derivative of the curve at each of said vertexes.

5. The method according to claim 1, wherein said extracting said first points of the outer edge (a) and said second points of the inner edge (b) are performed through edge detection methods.

6. The method according to claim 1, further comprising a step of calculating a barycentre (c) of said inner polygonal (B).

7. The method according to claim 1, wherein said geometric relation is a function of an angle $\beta_i$ formed between
   a half-line passing through each of said reference points ($R_i$) and said barycentre (c) and
   a reference line r passing for said barycentre.

8. The method according to claim 1, wherein said distance ($z_i$) between the polygonals is calculated as a length of a segment of said half-line comprised between the inner polygonal B and the outer polygonal A.

9. The method according to claim 1, further comprising a step of filtering said acquired image.

10. The method according to claim 1, further comprising a step of normalizing said acquired image.

11. The method according to claim 10, wherein said normalization is a geometric normalization performed with respect to a geometric pattern.

12. The method according to claim 10, wherein said normalization is a radiometric normalization.

13. The method according to claim 1, wherein said image has a resolution of at least 1000×1000 dots.

14. A method for evaluating evenness of pellucid zone thickness of a biological structure through a shape factor calculated with a method according to claim 1.

15. The method according to claim 14, wherein said biological structure is an egg-cell, a zygote, or an embryo.

16. A method for evaluating evenness of pellucid zone thickness of a biological structure through a shape factor, wherein said shape factor is calculated with a method according to claim 2.

17. The method according to claim 16, wherein for $\alpha = 2$, a shape factor value greater than $18\text{-}19 \times 10^3$ is indicative of low evenness of pellucid zone thickness.

18. The method according to claim 16, wherein said biological structure is an egg-cell, a zygote, or an embryo.

19. A computer program, stored on a non-transitory storage medium, apt to implement a method according to claim 1, when running in a computer.

* * * * *